UNITED STATES PATENT OFFICE.

GEORG KASSNER, OF BRESLAU, GERMANY.

PROCESS OF PRODUCING PLUMBATES OF ALKALINE EARTHS.

SPECIFICATION forming part of Letters Patent No. 430,653, dated June 24, 1890.

Application filed June 25, 1889. Serial No. 315,551. (No specimens.)

*To all whom it may concern:*

Be it known that I, GEORG KASSNER, doctor of philosophy, a subject of the Emperor of Germany, residing at Breslau, in the Empire of Germany, have invented a new and useful Process of Making Orthoplumbates of Alkaline Earths, of which the following is a specification.

As well known in chemistry, two plumbic acids exist, only known in their combinations and not in free state—viz: $H_2PbO_3$ metaplumbic acid, and $H_4PbO_4$ orthoplumbic acid.

The object of this invention is now to produce compounds of orthoplumbic acid $PbO_4H_4$ and alkaline earths—viz., lime, barium, and strontium, these compounds constituting the formulæ $PbO_4Ca_2$, $PbO_4Ba_2$, and $PbO_4Sr_2$, respectively.

By the reactions hereinafter described the oxygen of the air enters into combination in solid substances, these solid substances being orthoplumbate of calcium, orthoplumbate of barium, and orthoplumbate of strontium.

Orthoplumbate of calcium, $PbO_4Ca_2$, is a body of red yellowish color; orthoplumbate of barium, $PbO_4Ba_2$, is of black color, and orthoplumbate of strontium, $PbO_4Sr_2$, has a dark brown color.

To make orthoplumbate of calcium, constituting the formula $PbO_4Ca_2$, carbonate of lime or caustic lime or hydrate of lime, or a mixture thereof, is mixed with oxide of lead or carbonate of lead or red lead, or with any compound of lead or mixture of the last-named substances which produces oxide of lead when heated with admission of air. This mixture, which is preferably made to contain one atom of lead to every two atoms of calcium, is roasted while being exposed to the admission of air for a sufficient space of time, thereby causing oxygen to be absorbed from the air. When the absorption of oxygen ceases, the preparation—viz: orthoplumbate of calcium—is ready, which, in case the quantity of either of the substances mixed had exceeded the proper atomic proportion, contains such excess as an admixture of oxide or carbonate or hydrate. Orthoplumbate of barium, $PbO_4Ba_2$, and orthoplumbate of strontium, $PbO_4Sr_2$, are produced in the same manner as orthoplumbate of calcium, the corresponding compounds of barium and strontium, respectively, being substituted for the compounds of lime specified.

What I claim, and desire to secure by Letters Patent of the United States, is—

The process of producing plumbates of alkaline earths by roasting in free air a mixture of lead oxide and the carbonate or hydrate or caustic compound of an alkaline earth, or a mixture of such salts of lead as are reduced to oxides by heat and of the carbonate or hydrate or caustic compound of alkaline earths.

GEORG KASSNER.

Witnesses:
AUGUST HOFFMAN,
W. H. MUNDMAN.